Figure 1:
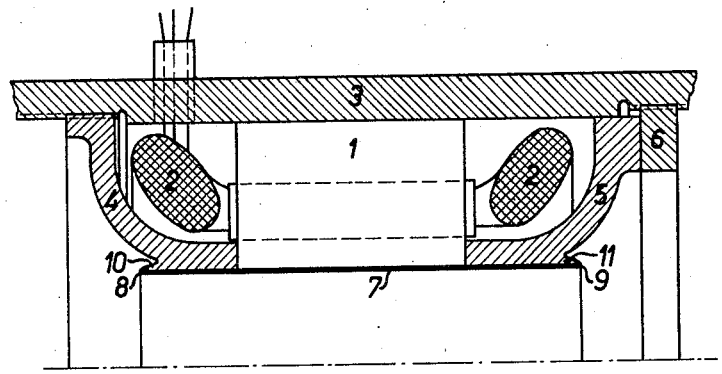

Aug. 27, 1957 A. SCHANZ 2,804,556
SEALED STATOR IN SUBMERSIBLE MOTORS
Filed Dec. 1, 1953

INVENTOR:
AUGUST SCHANZ
BY:

United States Patent Office 2,804,556
Patented Aug. 27, 1957

2,804,556

SEALED STATOR IN SUBMERSIBLE MOTORS

August Schanz, Frankenthal, Pfalz, Germany, assignor to Amag-Hilpert-Pegnitzhutte A. G., Nurnberg, Germany Application December 1, 1953, Serial No. 395,534

Claims priority, application Germany December 1, 1952

2 Claims. (Cl. 310—86)

In submersible motors of the "semi-wet" type, the winding and the bore of the stator laminations are generally screened by a metal tube known as a split tube. Thus, the stator winding is unaffected by the liquid with which the interior of the motor is filled, so that normal windings having normal insulation can be employed. If the thin-walled split tube is employed, for example, with submerged pumps, it is subjected to considerable pressure and therefore undergoes substantial mechanical stresses which make it difficult to employ the split tube principle with relatively high-power motors and often preclude the use of a split tube altogether. However, the use of a split tube is desirable for reasons other than those described in the foregoing in a number of cases, namely when it is desired to provide protection against the action of corrosive liquids. It is usually the case that the type of corrosion-proof motor employed for driving pumps conveying corrosive liquids or gases must be of relatively high power and the use of a thin-walled split tube to avoid excessively heavy electrical losses has not been possible.

In accordance with the invention, the aforementioned difficulties in employing a split tube with relatively high-power in submersible motors are obviated by providing an arrangement in which the split tube is relieved of mechanical load while at the same time the bundle of laminations is consolidated in the layer at the tip of the tooth. This effect is obtained according to the invention by reason of the fact that the bundle of laminations is compressed by covering members on both sides thereof and the thin split tube, screening the bundle of laminations is so mounted that it does not have to withstand any considerable tensile forces.

Bundles of laminations of stators constructed in this form have two shroud rings of arcuate cross-section which surround the coil ends and bear against the inner wall of a surrounding casing and the inner end faces of which compress the stator laminations, the said shroud rings connecting the thin split tube together in fluid-tight fashion. The casing in which the covering rings are disposed may consist of a tube. The shroud rings may either be screwed directly into the tubular casing by means of an external thread or it may be pressed against the bundle of laminations with the aid of special threaded rings engaging in an inner thread of the casing. The fluid-tight connection of the thin split tube to the shroud rings is preferably effected by welding. It is advantageous to carry out the welding operation on narrow annular extensions which are provided on the shroud rings and which impede the flow of heat, since otherwise the welding points on the shroud rings do not reach, during the welding operation, the temperature necessary to provide a tight joint.

In the production of the bundles of rotor laminations according to the invention, the bundle of laminations is sealed off at both sides by shroud rings which are connected in fluid-tight fashion to the shaft. The thin split tube is welded, in the same way as the stator laminations to narrow annular extensions which are provided on the shroud rings and which serve to impede the flow of heat.

In order to reduce the stresses set up in the bundles of laminations during operation, it is possible to apply thereto by way of the shroud rings an initial tension which corresponds to the pressure obtaining within the motor.

Figure 2:
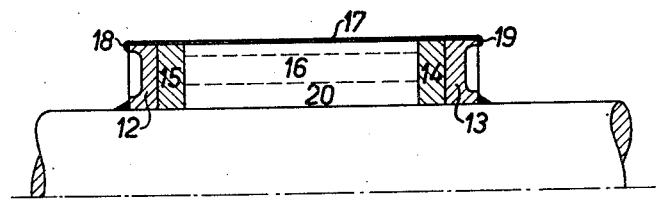

Embodiments of the invention are illustrated in the drawings, in which:

Figure 1 shows a bundle of laminations for a stator, in which one shroud ring is directly screwed into the casing, while the other shroud ring is pressed thereon with the aid of a special threaded ring, and Figure 2 illustrates a bundle of laminations according to the invention for a rotor.

In Figure 1 there can be seen the stator laminations from which the coil ends 2 extend and which is surrounded by the tubular casing 3. The shroud ring 4 is screwed directly into the casing, while the shroud ring 5 is illustrated in the other form in which it is pressed against the bundle of laminations by the special threaded ring 6. The thin split tube 7 is welded in fluid-tight fashion by the welded seams 8, 9 to the narrow annular extensions 10, 11 which are provided on the shroud rings and which serve to impede the flow of heat.

Figure 2 illustrates a rotor according to the invention, in which the shroud rings 12, 13 compress the bundle of laminations 16 through the short-circuiting rings 14, 15. The thin split tube 17 is welded in fluid-tight fashion to annular projections 18, 19 serving to impede the flow of heat. The shroud rings 12, 13 are also connected in fluid-tight fashion by welding to the shaft 20.

I claim:

1. A stator construction for an electrical machine comprising, in combination, a hollow cylindrical housing; a stack of laminations mounted in said housing and coaxial therewith; a pair of shroud rings respectively engaging the end laminations of said stack and at least one ring having an outer threaded periphery screwed into said housing so that said rings compress said stack of laminations, said shroud rings respectively having inner peripheries located beyond said stack and respectively having at said inner peripheries outwardly extending annular projections of relatively thin cross-section; and a thin-walled tube engaging said peripheries of said shroud rings and extending across the space therebetween, said tube being fixed only to said rings at outer end portions of said tube which are respectively welded to said projections of said shroud rings so that said shroud rings together with said tube and said housing form a fluid-tight enclosure for said stack of laminations and whereby, due to the compression of said stack of laminations by said shroud rings, said thin-walled tube is free of mechanical stresses.

2. A stator construction for an electrical machine comprising, in combination, a hollow cylindrical housing of given inside diameter; a stack of laminations mounted in said housing and coaxial therewith; a pair of shroud rings respectively engaging the end laminations of said stack and having an outer diameter substantially equal to said inside diameter of said housing, said shroud rings respectively having inner peripheries located beyond said stack and respectively having at said inner peripheries outwardly extending annular projections of relatively thin cross-section; a thin-walled tube engaging said peripheries of said shroud rings and extending across the space therebetween, said tube having outer end portions respectively welded to said projections of said shroud rings so that said shroud rings together with said tube and said housing form a fluidtight enclosure for said stack of laminations; and at least one end ring abutting against the outer face of one of said shroud rings, said end ring having an outer threaded periphery screwed in said housing and pressing said shroud rings respectively against said stack of laminations, whereby said thin-walled tube welded to said shroud rings is free of mechanical stresses.

References Cited in the file of this patent

UNITED STATES PATENTS

| | | |
|---|---|---|
| 874,084 | Jottrand et al. | Dec. 17, 1907 |
| 1,405,959 | Woock et al. | Feb. 7, 1922 |
| 1,425,308 | Woock et al. | Aug. 8, 1922 |
| 2,485,408 | Pezzillo | Oct. 18, 1949 |
| 2,568,548 | Howard et al. | Sept. 18, 1951 |
| 2,654,848 | Schaefer | Oct. 6, 1953 |

FOREIGN PATENTS

| | | |
|---|---|---|
| 421,857 | Great Britain | Jan. 1, 1935 |
| 494,601 | Great Britain | Oct. 28, 1938 |
| 107,078 | Switzerland | Jan. 2, 1924 |